United States Patent
Gallagher, Jr. et al.

(10) Patent No.: US 7,933,758 B2
(45) Date of Patent: Apr. 26, 2011

(54) METHOD AND APPARATUS FOR GEOMODEL UPLAYERING

(75) Inventors: Joseph G. Gallagher, Jr., Bartlesville, OK (US); Jianbing Wu, Stanford, CA (US); Kenneth J Harpole, Bartlesville, OK (US)

(73) Assignee: ConocoPhillips Company, Houston, TX (US)

(*) Notice: Subject to any disclaimer, the term of this patent is extended or adjusted under 35 U.S.C. 154(b) by 807 days.

(21) Appl. No.: 11/567,096

(22) Filed: Dec. 5, 2006

(65) Prior Publication Data

US 2008/0133192 A1    Jun. 5, 2008

(51) Int. Cl.
*G06G 7/48* (2006.01)
(52) U.S. Cl. .......................................................... 703/10
(58) Field of Classification Search ...................... 703/10
See application file for complete search history.

(56) References Cited

U.S. PATENT DOCUMENTS

| 6,106,561 | A  | 8/2000  | Farmer |
| 6,662,109 | B2 | 12/2003 | Roggero et al. |
| 6,826,520 | B1 | 11/2004 | Khan et al. |
| 2005/0015231 | A1 | 1/2005 | Edwards et al. |

OTHER PUBLICATIONS

D. Li and B. Beckner, Optimal Uplayering for Scaleup of Multimillion-Cell Geologic Models, SPE International, 2000, 1-16, Society of Petroleum Engineers Inc., Dallas, Texas.

Novakovic. D. Numerical Reservoir Characterization Using Dimensionless Scale Numbers With Application in Upscaling. PhD Dissertation, Louisiana State University and Agricultural and Mechanical College, Aug. 2002, Especially pages 22-28.

*Primary Examiner* — Hugh Jones

(57) ABSTRACT

Embodiments of the present invention provide a method and apparatus for geomodel uplayering. The method may include calculating one or more vertical cell property means for cells within a three-dimensional geomodel, generating at least one vertical mean trend sum utilizing the vertical cell property means, grouping cells utilizing at least one of the vertical mean trend sums to define a plurality of cell regions, calculating at least one horizontal cell property variance for at least one of the cell regions, and forming a plurality of cell blocks utilizing one or more of the horizontal cell property variances.

10 Claims, 5 Drawing Sheets

METHOD AND APPARATUS FOR GEOMODEL UPLAYERING

BACKGROUND OF THE INVENTION

1. Field of the Invention

Embodiments of the present invention relate to methods and apparatuses for geomodel uplayering. More particularly, various embodiments of the present invention relate to methods and apparatuses that employ regionalization and non-uniform uplayering to accurately reduce geomodel complexity.

2. Description of the Related Art

Geologic models, such as petroleum reservoir geologic models, are often utilized by computer systems for simulation. For example, computer systems may utilize petroleum reservoir geologic models to simulate the flow and location of hydrocarbons within a reservoir. Geologic models are typically formed utilizing millions, or in some cases billions, of geologic cells, with each cell corresponding to a location and a physical geologic feature. As there is a general correlation between the number of cells a model contains and the simulation accuracy provided by the model, it is generally desirable to form geologic models utilizing as many cells as possible. Unfortunately, available computing power and time constraints limit the number of cells that may be practically utilized by geologic models. For instance, billion cell geologic models may be formed to accurately reflect a petroleum reservoir, but the computing power required to simulate a billion cell model in a reasonable amount of time may require the use of massively parallel and prohibitively expensive computing systems.

To reduce the complexity of geologic models, and thus the computing power required for simulation, upscaling methods have been developed. Conventional upscaling methods typically uniformly group layers of cells into a coarse model that may be used for simulation. Unfortunately, such coarse and uniform grouping results in a loss of model heterogeneity and a reduction in the accuracy of computer simulations.

SUMMARY OF THE INVENTION

Embodiments of the present invention solve the above-described problems and provide a distinct advance in the art of geomodel uplayering. More particularly, various embodiments of the invention relate to methods and apparatuses that employ regionalization and non-uniform uplayering to facilitate computer simulation.

In particular, embodiments of the present invention provide a method operable to upscale a three-dimensional model including a plurality of cells positioned within a plurality of zones. The method generally comprises calculating one or more vertical cell property means, generating at least one vertical mean trend sum utilizing the vertical cell property means, grouping cells utilizing at least one of the vertical mean trend sums to define a plurality of cell regions, calculating at least one horizontal cell property variance for at least one of the cell regions, and forming a plurality of cell blocks utilizing one or more of the horizontal cell property variances.

Such embodiments may be employed to enable non-uniform uplayering of fine-scale geomodels to produce uplayered models that reduce the number of cells required for computation and simulation while generally preserving the underlying features of the original fine-scale geomodel. Other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 3 is a block diagram of an exemplary geomodel layer showing the calculation of sample vertical mean trend sums;

Figure 5:
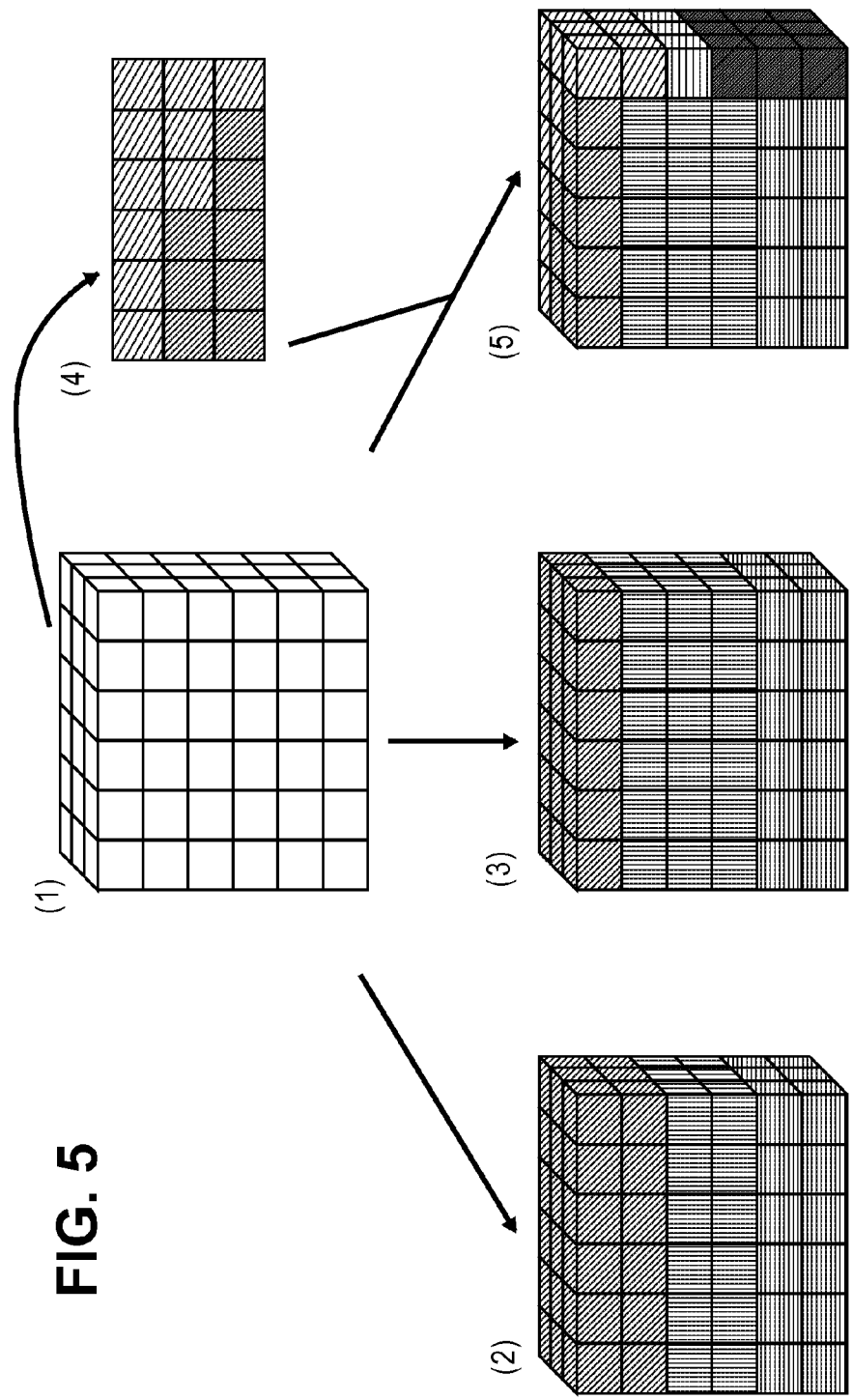
Figure 6:
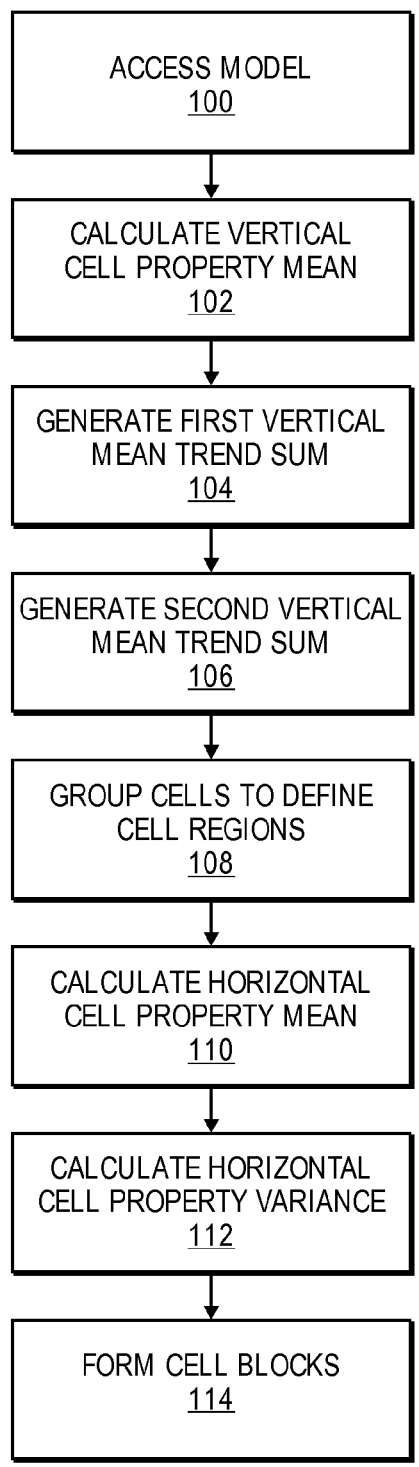

FIGS. 4(a) through (i) are block diagrams showing sample region groupings and region identifiers;

FIG. 5 is a block diagram showing exemplary uplayered geomodels formed utilizing various uplayering methods; and FIG. 6 is a flow chart showing some of the steps that may be performed by various embodiments of the present invention.

The drawing figures do not limit the present invention to the specific embodiments disclosed and described herein. The drawings are not necessarily to scale, emphasis instead being placed upon clearly illustrating the principles of various embodiments of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
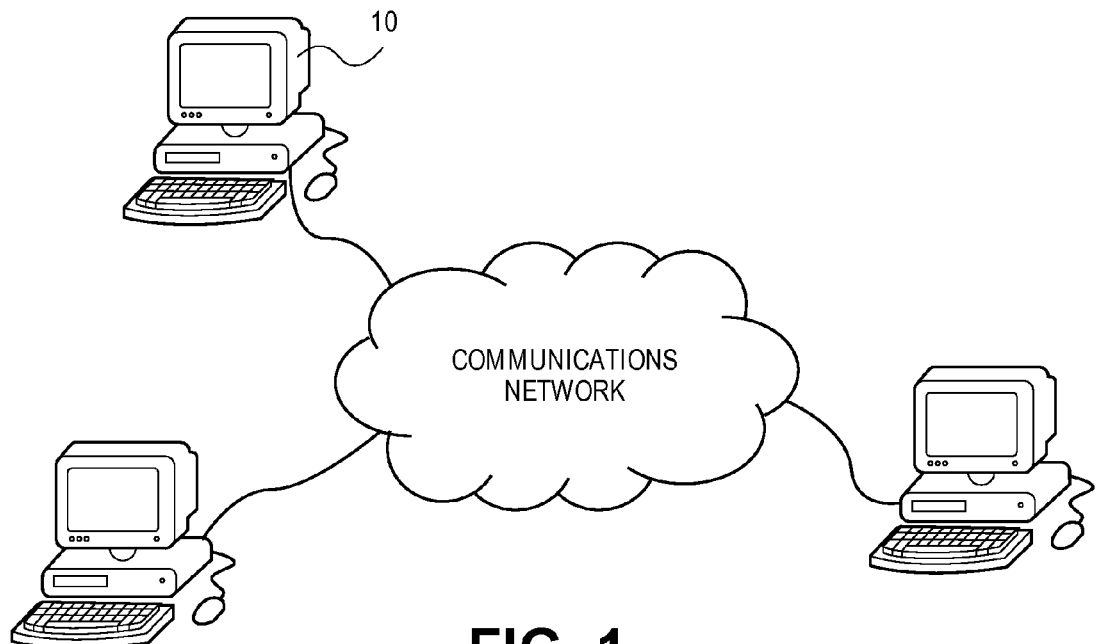
FIG. 1 is a schematic diagram of equipment operable to be utilized by various embodiments of the present invention.

Methods consistent with the present teachings are especially well-suited for implementation by a computing element, such as the computer 10 illustrated in FIG. 1. The computer 10 may be a part of a computer network that includes one or more client computers and one or more server computers interconnected via a communications system such as an intranet or the internet. It will be appreciated, however, that the principles of the present invention are useful independently of a particular implementation, and that one or more of the steps described herein may be implemented without the assistance of the computing device or with the assistance of a plurality of computing devices.

The present invention can be implemented in hardware, software, firmware, and/or a combination thereof. In a preferred embodiment, however, the invention is implemented with a computer program. The computer program and equipment described herein are merely examples of a program and equipment that may be used to implement the present invention and may be replaced with other software and computing devices without departing from the scope of the present teachings.

Computer programs consistent with the present teachings can be stored in or on a computer-readable medium residing on or accessible by the computer 10 for instructing the computer 10 to implement methods as described herein. The computer program preferably comprises a plurality of code segments corresponding to executable instructions for implementing logical functions in the computer 10 and other computing devices coupled with the computer 10. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

It will be understood by persons of ordinary skill in the art that the program may comprise a single list of executable instructions or two or more separate lists, and may be stored on a single computer-readable medium or multiple distinct media.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

A flowchart of steps that may be utilized by embodiments of the present invention is illustrated in FIG. 6. Some of the blocks of the flow chart may represent a code segment or other portion of the compute program. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved.

Figure 2:
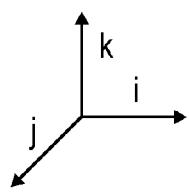
FIG. 2 is a block diagram of an exemplary geomodel showing the calculation of a sample vertical cell property mean.
Figure 2:
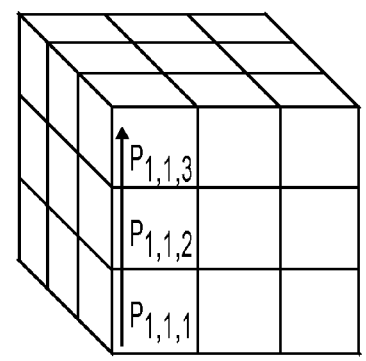

In step 100, a geomodel is accessed. The accessed geomodel is a three-dimensional model including a plurality of cells. In various embodiments, the geomodel may represent a subterranean volume. The cells within the geomodel are arranged on a uniform three-dimension axis, i, j, and k, as shown in FIG. 2, such that each cell represents a predefined volume. Each cell also preferably includes at least one cell property, representing a feature of its corresponding volume. For example, the cell property may include rock type, porosity, permeability, water saturation, combinations thereof, and the like. Such geomodels are well known in the art and may be formed utilizing conventional methods.

The geomodel accessed by embodiments of the present invention may include any number of cells. Preferably, the cells within the accessed geomodel are positioned within a plurality of zones that correspond to various features of the volume to which the model corresponds. In embodiments where the cells within the geomodel are not positioned according to a plurality of zones, the zones are preferably defined using conventional zonation methods and techniques.

In some embodiments, the geomodel is at least partially stored within a memory coupled with the computer 10, such that the geomodel may be accessed in step 100 by accessing the memory and retrieving data therefrom. The geomodel may also be retrieved from other computing devices or computer-readable memories through a communications network, such that the geomodel is not necessarily local to the computer 10 or retained entirely on one computing device or computer-readable medium.

In step 102, a vertical cell property mean is generated for at least one cell within at least one zone. Preferably, the vertical cell property mean is calculated for all cells along a generally horizontal plane within each zone. For example, as shown in FIG. 2, the vertical cell property mean may be calculated for each i, j cell within each zone based upon the average cell property along the k axis. Thus, the vertical cell property mean for a cell having i,j coordinates of 1,1 positioned within a three-by-three zone would be:

$$V_{1,1} = \frac{P_{1,1,1} + P_{1,1,2} + P_{1,1,3}}{3}$$

where V is the vertical cell property mean and $P_{x,y,z}$ is the cell property value at cell coordinates x, y, and z.

As the vertical cell property mean corresponds to the average cell property of cells having a common vertical axis, the horizontal plane to which the vertical cell property means may correspond to any two-dimensional volume of cells within each zone that is generally perpendicular to the vertical axis of the zone. The generated vertical cell property means may be stored by the computer 10, such as within a computer-readable medium, for later access.

In step 104, a first vertical mean trend sum is generated along a first axis within each zone. The first vertical mean trend sum preferably corresponds to the sum of the vertical cell property means calculated in step 102 along a first horizontal axis within the zone. For example, the first vertical mean trend sum may represent the sum of the vertical cell property means along all j cell locations for all i cell locations within each zone. Specifically, as shown in FIG. 3, the first vertical mean trend sum may be calculated for each j cell location along the horizontal plane utilized in step 102 to generate the vertical cell property means.

In step 106, a second vertical mean trend sum is generated along a second axis within each zone. The second vertical mean trend sum preferably corresponds to the sum of the vertical cell property means calculated in step 102 along a second horizontal axis within each zone. For example, the second vertical mean trend sum may represent the sum of the vertical cell property means along all i cell locations for all j cell locations within each zone. Specifically, as shown in FIG. 3, the first vertical mean trend sum may be calculated for each i cell location along the horizontal plane utilized in step 102 to generate the vertical cell property means.

In step 108, cells within the zones are grouped to define a plurality of regions. Preferably, the regions are at least initially formed utilizing the vertical mean trend sums generated in steps 104 and 106. However, in some embodiments the regions may be formed utilizing only one of the vertical mean trend sums.

The regions formed in step 108 each comprise the same vertical dimension but different horizontal dimensions. For example, each region formed in step 108 may include the same number of cells along its k axis but a varying number of cells along its i and j axes. In various embodiments, the regions are formed in step 108 by splitting each zone along its i and j axes based upon a residual calculated from the vertical mean trend sums generated in steps 104 and 106. For example, the regions may be formed by first splitting each zone along the i direction based upon a first mean residual and then splitting each zone along the j direction based on a second mean residual.

Preferably, the regions are formed utilizing the mean residuals, described below in more detail, and input parameters provided by a user, such as through inputs to the computer 10, or by values determined by the computer 10 itself. The input parameters may include a maximum number of regions that may be formed along the i (x) and j (y) directions. The input parameters may also include a residual cutoff for the i (x) and j (y) axes.

Generally, the zones may be split along the i direction to form a plurality of regions while:

$$N < N_x \text{ and } mean_1 > X_{cutoff}$$

where N is the current number of regions along the i direction, $N_x$ is the input parameter corresponding to the maximum number of regions that may be formed along the i direction, $mean_1$ is the first mean residual, and $X_{cutoff}$ is the residual cutoff along the i (x) axis.

Similarly, the zones may be split along the j direction to form a plurality of regions while:

$$N < N_y \text{ and } mean_2 > Y_{cutoff}$$

where N is the current number of regions along the j direction, $N_y$ is the input parameter corresponding to the maximum number of regions that may be formed along the j direction, $mean_2$ is the second mean residual, and $Y_{cutoff}$ is the residual cutoff along the j (y) axis.

The first mean residual is formed utilizing the first vertical mean trend sums generated in step 104. In particular, the first mean residual is formed by averaging all the first vertical mean trend sums within each zone and determining the difference between the individual first vertical mean trend sums in each zone and the calculated average. The zone is spilt along the i axis as discussed above in a manner that minimizes the first mean residual, such as by splitting the zone along the i axis only while the calculated mean residual is greater than the corresponding residual cutoff parameter.

The second mean residual is formed in a substantially similar manner, with the exception that the second mean residual is formed by utilizing the second vertical mean trend sums generated in step 106. Thus, the zone is split along the j axis as discussed above in a manner than minimizes the second mean residual, such as by splitting the zone along the j axis only while the calculated mean residual is greater than the corresponding residual cutoff parameter.

Figure 4:
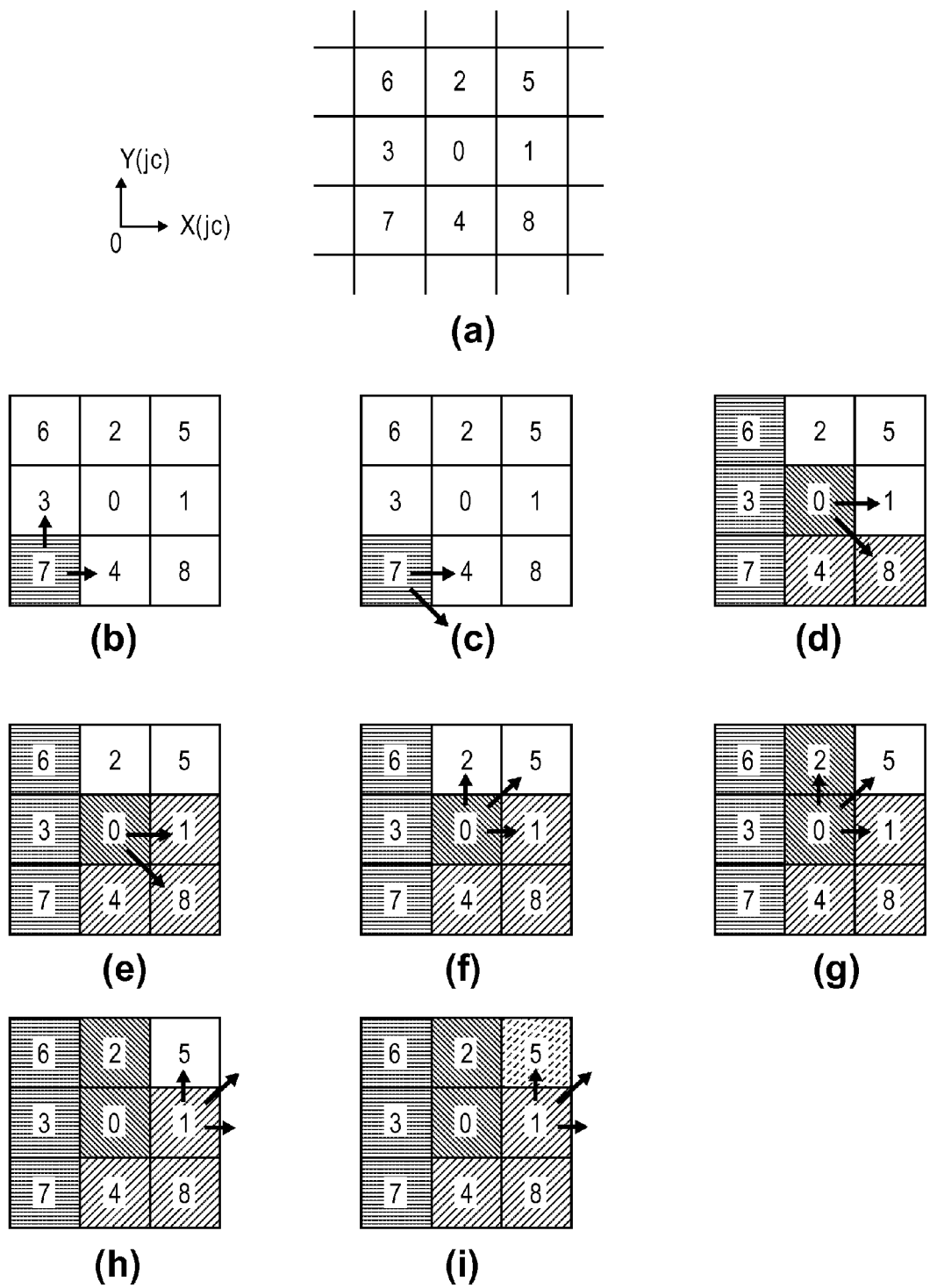

Referring to FIGS. 4(*a*) through (*i*), the regions determined utilizing the first mean and second mean residuals, as discussed above, may be further grouped based on the neighboring connectors of each region and the distance between the regions. A region is a neighbor to another region when it shares a common edge with the other region. As discussed below, the distance between two regions is defined as the absolute value of a property difference between the two regions.

FIG. 4(*a*) illustrates a sample coarse mesh including 9 regions created by splitting a zone utilizing the first and second mean residuals as discussed above. Each region within the coarse mesh is initially assigned an identifier. Within the example of FIG. 4(*a*), regions 0 and 1 are neighbors, as are regions 1 and 5, but regions 0 and 5 are not neighbors.

A distance is preferably calculated for the various regions within the coarse mesh to facilitate further grouping of the regions. The distance may be defined as:

$$dist(I, J) = |P_I - P_J|$$

where I is a first region, J is a second region, $P_I$ is the mean of the cell property values that comprise the first region, and $P_J$ is the mean of the cell property values that comprise the second region.

Utilizing the calculated distances, the regions within each zone are further grouped into larger regions by assigning region identifiers to each region. Each region identifier may correspond to any number of regions. For example, a first identifier may represent two or more particular regions that comprise the coarse mesh.

The assignment of region identifiers to a plurality of regions is illustrated in the exemplary progression of FIGS. 4(*b*) through 4(*i*). For example, a first region identifier is shown representing regions 7, 3, and 6, a second region identifier is shown representing regions 0 and 2, a third region identifier is shown representing regions 4, 8, and 1, and a fourth region identifier is shown representing region 5.

To ascertain if the region identifiers should be assigned to a particular region, the distance, defined above, between neighboring regions is preferably compared to a region cutoff value. The region cutoff value is preferably one of the input parameters provided by the user or the computer 10, but may be derived from other sources, such as a combination of the input parameters or by a static pre-defined value.

If the distance between two neighboring regions is less than or equal to the region cutoff value, the two neighboring regions are assigned the same region identifier. If the distance between two neighboring regions is greater than the region cutoff value, the two neighboring regions are assigned a different region identifier. Preferably, the distance comparison begins at one corner of the mesh and proceeds towards the other corner.

Referring to the exemplary progression of FIGS. 4(*b*) through 4(*i*), the distance between neighboring regions 7 and 3 and 7 and 4 is first compared, as shown in FIG. 4(*b*). Assuming dist(7,4) is greater than the region cutoff value, regions 7 and 4 are assigned different region identifiers, as is shown in FIG. 4(*d*).

As is also shown in FIG. 4(*d*), the region indicator is preferably not only decided by the distance between neighbored regions, but also by regions neighboring the neighbored regions. For example, if the current region is region 0, then the region identifier is decided by both the distance between block 0 and block 1 and the distance between block 1 and block 8.

Specifically, if dist(0,1)≦dist(1,8) and dist(0,1)≦region cutoff value, then regions 0 and 1 are assigned the same region identifier. If dist(0,1)>dist(1,8) and dist(1,8)≦region cutoff value, then regions 8 and 1 are assigned the same region identifier. If neither of the above are satisfied, then block 1 is assigned a new region identifier.

In situations where a region does not have upper neighbors, such as region 2 in the example of FIGS. 4(*b*) through 4(*i*), the region identifier assignment is decided by the distance between adjacent and lower regions, such as the distance between regions 0 and 2, 2 and 5, and 5 and 1. Specifically, if $$dist(1,2) \leq \text{region cutoff value},$$

$$dist(1,5) \leq \text{region cutoff value, and}$$

$$dist(2,5) \leq \text{region cutoff value}$$

then regions 2 and 1 are assigned the same identifier. If dist(0,2) is less than or equal to the region cutoff value, then regions 0 and 2 are assigned the same identifier. If neither of the above are true, then region 2 is assigned a new region identifier.

In situations where a region does not have neighbors to its right, such a region 1 in the example of FIGS. 4(*b*) through 4(*i*), the region identifier assignment is decided utilizing the distance between the region and its upper neighbor. For example, if dist(1,5) is less than or equal to the region cutoff value, then regions 1 and 5 are assigned the same identifier. Otherwise, region 5 is assigned a new identifier.

The above method is preferably performed for all regions within the coarse mesh such that all regions within each zone are assigned to an identifier. Preferably, the number of identifiers is less than the number of regions within each zone to further reduce the complexity of the model and required computing power. However, region grouping utilizing region identifiers as discussed above is not necessarily performed in all embodiments, as the regions may be formed and grouped utilizing only the first and/or second vertical mean trend sums discussed above. Further, in some embodiments, step 108 may be performed independently of steps 102-106, such as where particular cells are grouped together based on the distance between the cells.

The regions formed and/or grouped in step 108 are preferably three dimensional volumes including at least one cell in the i, j, and k directions. However, in some embodiments the formed regions may be two-dimensional areas.

In step 110, a horizontal cell property mean is calculated. The horizontal cell property mean is preferably calculated for each layer within each region within each zone. In embodiments where regions are assigned region identifiers as discussed above, the horizontal cell property mean is preferably calculated for each layer with the grouping of regions corresponding to each identifier.

The layers for which the horizontal cell property means are calculated preferably correspond to a two dimensional horizontal slice of a region and/or region grouping. Thus, each layer within a region, or region grouping, may correspond to the cells along the i and j axes for a given k value. For each layer, the horizontal cell property mean is calculated from the average of the cell properties corresponding to the cells in each layer.

In step 112, a horizontal cell property variance is calculated. The horizontal cell property variance is preferably calculated for all regions, or region groupings, within each zone. The horizontal cell property variance generally corresponds to the variance in the horizontal cell property means, calculated in step 110, for each region or region grouping. Specifically, the horizontal cell property variance is calculated for each region or region grouping by averaging all the horizontal cell property means within each region or region grouping and determining the difference between the individual horizontal cell property means and the calculated average.

In step 114, cell blocks are formed utilizing the horizontal cell property variance calculated in step 112. Preferably, the regions, or region groupings, defined in step 108 are split to form the cell blocks in 114. Thus, each cell block may comprise any portion of one or more regions, including three-dimensional or two-dimensional cell volumes.

The cell blocks are preferably formed utilizing the horizontal cell property variance such that regions, or region groupings, are split based on their corresponding horizontal cell property variance. In particular, the regions, or region groupings, are searched to identify the region, or region grouping, having the maximum horizontal cell property variance.

If the maximum horizontal cell property variance is less than a vertical residual cutoff, further cell block formation, and uplayering, is not required. The vertical residual cutoff is preferably one of the input parameters provided by the user or the computer 10, but it may be derived by the computer 10 or correspond to a static pre-defined value. If the maximum horizontal cell property variance is greater than the vertical residual cutoff, then the region, or region grouping, corresponding to the maximum horizontal cell property variance is split into upper and lower cell blocks to minimize the resulting horizontal cell property variance. After splitting the region, or region grouping, having the maximum horizontal cell property variance, steps 110 and 112 are repeated to update the horizontal cell property means and horizontal cell property variances. Further, the cell blocks caused by splitting the region, or region grouping, having the maximum horizontal cell property variance are assigned a cell block identifier. If a region or region grouping is not split, it may be assigned a cell block identifier corresponding to its region identifier such that a particular cell block may have the same cell configuration as a particular region or region grouping.

Step 114 is repeated for each zone until the maximum horizontal cell property variance is less than the vertical residual cutoff or until the maximum number of cell blocks is exceed. The input parameters provided by the user or derived by the computer 10 may include a cell block limit such that the uplayering process of step 114 is halted once the cell block limit is reached.

In some embodiments, the cell blocks may be formed utilizing weighting criteria to favor cell block formation based on one or more cell properties. In various embodiments, the weighting criteria may correspond to a reservoir property such permeability, water saturation, porosity, facies, etc. The weighting criteria can be a product, a ratio, a logarithm, a power, an exponential or any mathematical functional, combinations thereof, and the like. The weighting criteria may be embodied in a weighting file operable to be utilized by the computer 10 or may be manually provided by the user.

The weighting criteria may include the mathematical function $\log_{10}(K_X)$ and/or $\log_{10}(K_X*(1-SWAT))$, where $K_X$ is permeability in the x direction and SWAT is water saturation. Using the latter weighting criteria function increases the layer lumping cell block size in aquifer sections of the coarsened geomodel over the $\log_{10}(K_X)$ weighting while at the same time increasing emphasis on the preservation of heterogeneity and connectivity in the 3-D volume of the reservoir geomodel where the water saturation is less than unity, thereby decreasing the cell block sizes in these volumes. This type of parameter weighting can be extended to using different weighting functional forms in different reservoir zones in a fine scale geomodel in addition to using one functional form for the entire layering lumping of a fine scale geomodel. Further, in some embodiments other steps may utilize parameter weighting criteria, such as the grouping provided by step 108.

Performance of steps 100 through 114 enables cells within a plurality of geomodel zones to be non-uniformly grouped to facilitate accurate computer simulation. For example, if a 6×3×6 fine scale model is desired to be grouped into 3 coarse layers, as shown in the examples of FIG. 5, the uniform coarse grid, created by uniform uplayering, shown in examples two and three, may not accurately reflect the fine scale model. In contrast, example five of FIG. 5, created by performing regionalization as shown in example four and non-uniform uplayering as provided by steps 100-114 enables the uplayered, three layer, model to more accurately reflect the features of the original fine scale model.

Further, grouping provided by embodiments of the present invention decreases the degradation of the total average vertical to average horizontal permeability ratio from all coarsened cells in the uplayered/upscaled geomodel, compared to uniform uplayering, and provides improved preservation of the contrast between upscaled cell blocks and the original cells.

The uplayered geomodel formed through steps 100 and 114 may be used to perform a computer situation to ascertain a characteristic of the volume to which the geomodel corresponds. For example, in embodiments where the geomodel corresponds to a subterranean volume, the computer 10 may perform a flow simulation utilizing the formed cell blocks to identify the nature, location, or movement of hydrocarbon resources.

Having thus described the preferred embodiment of the invention, what is claimed as new and desired to be protected by Letters Patent includes the following:

1. A method of upscaling a three-dimensional model including a plurality of cells positioned within a plurality of zones, the method comprising:
   accessing the three dimensional model with a computer wherein the computer performs the following steps:
   (a) calculating a vertical cell property mean for at least one cell within at least one zone wherein the cell property is selected from the group consisting of rock type, porosity, permeability, water saturation, and combinations thereof;
   (b) generating at least one vertical mean trend sum for at least one of the zones utilizing the vertical cell property mean;
   (c) grouping cells utilizing the vertical mean trend sum to define a plurality of cell regions;
   (d) calculating a horizontal cell property variance for at least one of the cell regions; and
   (e) forming a plurality of cell blocks utilizing the horizontal cell property variance and further including the step of forming the plurality of cell blocks utilizing the maximum residual of the calculated variances.

2. The method of claim 1, wherein (b) includes— generating a first vertical mean trend sum along a first axis within each zone; and
   generating a second vertical mean trend sum along a second axis within each zone.

3. The method of claim 1, wherein the cell regions defined in (c) each include a plurality of cell layers.

4. The method of claim 3, further including—
   (f) calculating a horizontal cell property mean for at least one layer within at least one region.

5. The method of claim 4, wherein (d) includes calculating the horizontal cell property variance utilizing the horizontal cell property mean.

6. The method of claim 1, further including—
   (g) performing a flow simulation utilizing the formed cell blocks.

7. A method of upscaling a three-dimensional model including a plurality of cells positioned within a plurality of zones, the method comprising:
   accessing the three dimensional model with a computer;
   assigning a dimension as a vertical dimension wherein the remaining two dimensions define a generally horizontal plane; and
   wherein, based on the assigned dimensions, the computer performs the following steps:
   (a) calculating a vertical cell property mean for each cell within a generally horizontal plane within each zone wherein the cell property is selected from the group consisting of rock type, porosity, permeability, water saturation, and combinations thereof;
   (b) generating a first vertical mean trend sum along a first axis within each zone;
   (c) generating a second vertical mean trend sum along a second axis within each zone;
   (d) grouping cells within each zone according to the vertical mean trend sums to define a plurality of cell regions each having a plurality of cell layers;
   (e) calculating a horizontal cell property mean for each layer within each region;
   (f) calculating a horizontal cell property variance for all regions in all zones using the horizontal cell property means; and
   (g) forming a plurality of cell blocks utilizing the calculated variances and further including the step of forming the plurality of cell blocks utilizing a maximum residual of the calculated variances.

8. The method of claim 7, further including—
   (h) performing a flow simulation utilizing the formed cell blocks.

9. A method of upscaling a three-dimensional model including a plurality of cells positioned within a plurality of zones, the method comprising:
   accessing the three dimensional model with a computer;
   assigning a dimension as a vertical dimension wherein the remaining two dimensions define a generally horizontal plane; and
   wherein, based on the assigned dimensions, the computer performs the following steps:
   (a) calculating a vertical cell property mean for each cell within a generally horizontal plane within each zone wherein the cell property is selected from the group consisting of rock type, porosity, permeability, water saturation, and combinations thereof;
   (b) generating a first vertical mean trend sum along a first axis within each zone;
   (c) generating a second vertical mean trend sum along a second axis within each zone;
   (d) grouping cells within each zone according to the vertical mean trend sums to define a plurality of cell regions each having a plurality of cell layers;
   (e) calculating a horizontal cell property mean for each layer within each region;
   (f) calculating a horizontal cell property variance for all regions in all zones using the horizontal cell property means; and
   (g) forming a plurality of cell blocks utilizing the calculated variances, and further including the step of grouping cells by splitting the zones along the first and second axes utilizing mean residuals of the first and second vertical mean trends.

10. A method of upscaling a three-dimensional model including a plurality of cells positioned within a plurality of zones, the method comprising:
    accessing the three dimensional model with a computer wherein the computer performs the following steps:
    (a) calculating a vertical cell property mean for at least one cell within at least one zone wherein the cell property is selected from the group consisting of rock type, porosity, permeability, water saturation, and combinations thereof;

(b) generating at least one vertical mean trend sum for at least one of the zones utilizing the vertical cell property mean;
(c) grouping cells utilizing the vertical mean trend sum to define a plurality of cell regions;
(d) calculating a horizontal cell property variance for at least one of the cell regions; and
(e) forming a plurality of cell blocks utilizing the horizontal cell property variance and further including the step of grouping cells by splitting the zones along the vertical and horizontal axes utilizing mean residuals of the first and second vertical mean trend sums.

* * * * *